(12) United States Patent
Muse

(10) Patent No.: US 9,056,715 B2
(45) Date of Patent: Jun. 16, 2015

(54) BAG STAND

(75) Inventor: John Richard Muse, Douglasville, GA (US)

(73) Assignee: Pratt Industries, Inc., Conyers, GA (US)

( * ) Notice: Subject to any disclaimer, the term of this patent is extended or adjusted under 35 U.S.C. 154(b) by 10 days.

(21) Appl. No.: 13/551,575

(22) Filed: Jul. 17, 2012

(65) Prior Publication Data

US 2013/0020449 A1 Jan. 24, 2013

Related U.S. Application Data

(60) Provisional application No. 61/508,914, filed on Jul. 18, 2011.

(51) Int. Cl.
*B65F 1/14* (2006.01)
*B65F 1/06* (2006.01)

(52) U.S. Cl.
CPC .................. *B65F 1/06* (2013.01); *B65F 1/1415* (2013.01); *B65F 1/1468* (2013.01); *B65F 2210/181* (2013.01); *B65F 2220/101* (2013.01); *B65F 2220/106* (2013.01); *B65F 2220/12* (2013.01); *B65F 2230/126* (2013.01); *B65F 2240/138* (2013.01); *B65F 2250/00* (2013.01)

(58) Field of Classification Search
USPC ............ 248/95, 97, 99; 220/9.1, 9.2, 9.3, 9.4; 383/33, 34, 34.1, 104, 119
See application file for complete search history.

(56) References Cited

U.S. PATENT DOCUMENTS

| | | |
|---|---|---|
| 361,185 A | 5/1887 | Richards |
| 474,382 A | 5/1892 | Haines |
| 513,352 A | 1/1894 | Vogt |
| 567,464 A | 9/1896 | Fulton |
| 593,721 A | 11/1897 | Hoffman |
| 645,544 A | 3/1900 | Bissell |
| 672,657 A | 4/1901 | Vautrot |
| 1,088,633 A | 2/1914 | Simmons |
| 1,234,057 A | 7/1917 | McIntyre |
| 1,858,793 A | 5/1932 | Reynolds |
| 1,571,608 A | 9/1932 | Stillman |
| 1,879,410 A | 9/1932 | Morris et al. |
| 1,879,950 A | 9/1932 | Read, Jr. |
| 2,430,155 A | 11/1947 | Buttery |
| 2,550,959 A | 5/1951 | Bowman |
| 2,939,614 A | 6/1960 | Hill |
| 3,257,068 A | 6/1966 | Wright |
| 3,324,906 A | 6/1967 | Chu |
| 3,335,769 A | 8/1967 | Ilg |
| 3,734,340 A | 5/1973 | Ippolito et al. |
| 3,746,240 A | 7/1973 | Flynn |
| 3,891,136 A | 6/1975 | Woeste |
| 3,938,731 A | 2/1976 | Ross et al. |
| 3,977,594 A | 8/1976 | Swan |

(Continued)

OTHER PUBLICATIONS

Muse, John Richard; Final Office Action for U.S. Appl. No. 13/164,464, filed Jun. 20, 2011, mailed Sep. 23, 2013, 8 pgs.

(Continued)

*Primary Examiner* — Alfred J Wujciak
(74) *Attorney, Agent, or Firm* — Taylor English Duma LLP

(57) ABSTRACT

A bag stand includes at least two side panels, each side panel having a top end, a bottom end, and two adjacent side ends, each side panel connected to at least one adjacent side panel to form a bag stand including a top end, a bottom end, and an interior and defining an opening at the top end.

20 Claims, 10 Drawing Sheets

(56) References Cited

U.S. PATENT DOCUMENTS

| | | | |
|---|---|---|---|
| 3,983,914 A | 10/1976 | Benson | |
| 4,037,778 A | 7/1977 | Boyle | |
| 4,115,909 A | 9/1978 | Corella | |
| 4,139,029 A | 2/1979 | Geraci | |
| 4,258,842 A | 3/1981 | Falkstein | |
| 4,268,081 A | 5/1981 | Hawkinson | |
| 4,273,167 A | 6/1981 | Stillwell | |
| 4,338,979 A | 7/1982 | Dow | |
| 4,361,267 A | 11/1982 | Wozniacki | |
| 4,366,916 A | 1/1983 | Guido et al. | |
| 4,457,483 A | 7/1984 | Gagne | |
| 4,530,533 A | 7/1985 | Dieter | |
| 4,643,380 A * | 2/1987 | Copeland | 248/97 |
| 4,659,045 A | 4/1987 | Flynn | |
| 4,669,689 A | 6/1987 | Jones | |
| 4,697,771 A | 10/1987 | Majors | |
| 4,749,011 A | 6/1988 | Rylander | |
| 4,760,982 A | 8/1988 | Cooke | |
| 4,884,603 A | 12/1989 | Simpson | |
| 4,890,652 A * | 1/1990 | Hoerner | 141/10 |
| 4,940,200 A | 7/1990 | Sawyer | |
| 4,955,496 A | 9/1990 | Nelson | |
| 4,979,547 A | 12/1990 | Hoerner | |
| 5,018,637 A | 5/1991 | Miller | |
| 5,048,778 A | 9/1991 | Wright | |
| 5,054,724 A | 10/1991 | Hutcheson | |
| 5,056,679 A | 10/1991 | Lonczak | |
| 5,065,965 A | 11/1991 | Aulabaugh | |
| 5,080,308 A | 1/1992 | Franks | |
| 5,090,756 A | 2/1992 | Pfisterer | |
| 5,129,609 A | 7/1992 | Tobin | |
| 5,271,589 A * | 12/1993 | Belous | 248/97 |
| 5,285,988 A | 2/1994 | Bogren | |
| 5,292,093 A | 3/1994 | Shumake | |
| 5,316,060 A | 5/1994 | Hogdon et al. | |
| 5,372,269 A | 12/1994 | Sutton et al. | |
| 5,400,989 A | 3/1995 | Gaskill | |
| D361,185 S | 8/1995 | Seiler et al. | |
| 5,593,117 A | 1/1997 | Alexander | |
| 5,610,230 A | 3/1997 | Yoshida et al. | |
| 5,716,033 A | 2/1998 | Gidson | |
| 5,765,614 A | 6/1998 | Kardosh | |
| 5,816,431 A | 10/1998 | Giannopoulos | |
| 5,868,364 A | 2/1999 | MacMillan | |
| 5,871,037 A | 2/1999 | Feldt | |
| 5,897,084 A | 4/1999 | Judge | |
| 5,915,768 A | 6/1999 | Young | |
| 5,918,651 A | 7/1999 | Gazdy et al. | |
| 5,979,842 A | 11/1999 | Fan | |
| 6,007,030 A | 12/1999 | Judge | |
| 6,035,908 A | 3/2000 | Hoffmann | |
| 6,073,943 A * | 6/2000 | Serrault | 280/47.26 |
| 6,085,647 A | 7/2000 | Burow | |
| 6,116,548 A | 9/2000 | Oleson | |
| 6,116,549 A | 9/2000 | Santa Cruz et al. | |
| 6,131,759 A | 10/2000 | Young | |
| 6,135,518 A | 10/2000 | Holthaus | |
| 6,189,841 B1 * | 2/2001 | LaPoint et al. | 248/99 |
| 6,202,718 B1 | 3/2001 | Innocenti | |
| 6,273,156 B1 | 8/2001 | Carillo | |
| 6,296,212 B1 | 10/2001 | Monahan | |
| 6,340,037 B1 | 1/2002 | Stafford | |
| 6,367,747 B1 | 4/2002 | Mulle | |
| 6,415,713 B1 | 7/2002 | Abrams | |
| 6,431,435 B1 | 8/2002 | Jones et al. | |
| 6,450,461 B1 | 9/2002 | Lohmann | |
| 6,481,617 B2 | 11/2002 | Yang | |
| 6,536,488 B1 * | 3/2003 | Pochobradsky | 141/390 |
| 6,554,810 B1 | 4/2003 | Wilk et al. | |
| 6,659,407 B2 | 12/2003 | Asaro | |
| 6,708,742 B2 | 3/2004 | Weathers et al. | |
| D500,457 S | 1/2005 | Peeples et al. | |
| 6,841,612 B1 | 1/2005 | Yang | |
| D502,582 S | 3/2005 | Boles | |
| 6,860,094 B1 | 3/2005 | Abrams | |
| 6,866,070 B2 | 3/2005 | King | |
| 6,896,015 B2 | 5/2005 | Beveridge | |
| D513,352 S | 12/2005 | Weathers et al. | |
| 6,983,965 B1 | 1/2006 | Bergell | |
| 7,066,220 B1 | 6/2006 | Take et al. | |
| 7,066,379 B2 | 6/2006 | McLeod et al. | |
| 7,152,894 B2 | 12/2006 | Weathers et al. | |
| 7,246,641 B2 | 7/2007 | Blessman | |
| 7,302,978 B1 | 12/2007 | Kolarik | |
| D567,464 S | 4/2008 | Dullum | |
| 7,367,600 B1 | 5/2008 | Lew et al. | |
| 7,398,913 B2 | 7/2008 | McClure | |
| 7,407,139 B1 | 8/2008 | Dolan | |
| 7,494,096 B2 | 2/2009 | Paloian et al. | |
| D593,721 S | 6/2009 | Koll | |
| 7,651,024 B2 | 1/2010 | Barner | |
| 7,694,838 B2 | 4/2010 | Yang | |
| 7,712,623 B2 | 5/2010 | Wentz et al. | |
| 7,736,057 B2 | 6/2010 | VanBost | |
| 7,810,766 B2 | 10/2010 | Blessman | |
| 7,815,153 B2 | 10/2010 | Campbell et al. | |
| D633,268 S | 2/2011 | Bottita | |
| D639,519 S | 6/2011 | Gomez | |
| 8,757,563 B2 | 6/2014 | Muse | |
| 8,840,072 B2 | 9/2014 | Muse | |
| 8,978,964 B1 | 3/2015 | Ruggiere, Sr. | |
| 2002/0074247 A1 | 6/2002 | Tremblay | |
| 2003/0173471 A1 | 9/2003 | Weathers et al. | |
| 2003/0218104 A1 | 11/2003 | Klotz | |
| 2006/0011785 A1 | 1/2006 | McLean | |
| 2006/0032991 A1 | 2/2006 | Gaines | |
| 2006/0144467 A1 | 7/2006 | Butzer | |
| 2008/0128479 A1 | 6/2008 | Bates et al. | |
| 2010/0108826 A1 | 5/2010 | Fernandez et al. | |
| 2010/0142860 A1 | 6/2010 | Mincozzi | |
| 2010/0237202 A1 | 9/2010 | Mincozzi | |
| 2010/0243650 A1 * | 9/2010 | Manley | 220/9.4 |
| 2010/0276247 A1 | 11/2010 | Babineau et al. | |

OTHER PUBLICATIONS

Muse, John Richard; Notice of Allowance for U.S. Appl. No. 13/164,481, filed Jun. 20, 2011, mailed Oct. 23, 2013, 11 pgs.

Muse; U.S. Patent Application Entitled: Bag Stand under U.S. Appl. No. 13/164,464, filed Jun. 20, 2011; 19 pgs.

Muse; U.S. Patent Application Entitled: Funnel and Stand for Bag under U.S. Appl. No. 13/164,473, filed Jun. 20, 2011; 27 pgs.

Muse; U.S. Patent Application Entitled: Bag Support under U.S. Appl. No. 13/164,481, filed Jun. 20, 2011; 21 pgs.

Muse; U.S. Patent Application Entitled: Funnel and Stand for Bag under U.S. Appl. No. 13/551,583, filed Jul. 17, 2012, 16 pgs.

Muse; U.S. Provisional Application entitled: Lawn Refuse Bag Holder having U.S. Appl. No. 61/357,526, filed Jun. 22, 2010; 10 pgs.

Muse; U.S. Provisional Application Entitled: Funnel and Support Stand for a Lawn Refuse Bag having U.S. Appl. No. 61/357,516, filed Jun. 22, 2010, 15 pgs.

Muse; U.S. Provisional Application Entitled: Insert for Gathering Lawn Refuse into a Bag having U.S. Appl. No. 61/357,518, filed Jun. 22, 2010, 15 pgs.

Muse; U.S. Provisional Application Entitled: Bag Stand having U.S. Appl. No. 61/508,914, filed Jul. 18, 2011, 16 pgs.

Muse; U.S. Provisional Application Entitled: Funnel and Stand for Bag having U.S. Appl. No. 61/508,934, filed Jul. 18, 2011, 12 pgs.

Muse, John Richard; Non-Final Office Action for U.S. Appl. No. 13/164,464, filed Jun. 20, 2011, mailed May 29, 2013, 12 pgs.

Muse; Non-Final Office Action for U.S. Appl. No. 13/164,473, filed Jun. 20, 2011, mailed Jun. 25, 2013, 14 pgs.

Muse; Non-Final Office Action for U.S. Appl. No. 13/164,481, filed Jun. 20, 2011, mailed Jul. 11, 2013, 11 pgs.

Muse, John Richard; Final Office Action for U.S. Appl. No. 13/164,464, filed Jun. 20, 2011; mailed Feb. 22, 2013, 6 pgs.

Muse, John; Final Office Action for U.S. Appl. No. 13/164,473, filed Jun. 20, 2011, mailed Mar. 13, 2013, 16 pgs.

Muse, John Richard; Final Office Action for U.S. Appl. No. 13/164,481, filed Jun. 20, 2011, mailed Apr. 5, 2013, 17 pgs.

(56) References Cited

OTHER PUBLICATIONS

Muse; Non-Final Office Action for U.S. Appl. No. 13/164,473, filed Jun. 20, 2011, mailed Dec. 3, 2012; 19 pgs.
Muse, John Richard; Non-Final Office Action for U.S. Appl. No. 13/164,481, filed Jun. 20, 2011, mailed Dec. 5, 2012; 18 pgs.
Muse, John Richard; Restriction Requirement for U.S. Appl. No. 13/164,464, filed Jun. 20, 2011, mailed Oct. 19, 2012; 6 pgs.
Muse, John Richard; Non-Final Office Action for U.S. Appl. No. 13/164,464, filed Jun. 20, 2011; mailed Nov. 16, 2012, 17 pgs.
Muse, John Richard; Applicant Initiated Interview Summary for U.S. Appl. No. 13/164,473, filed Jun. 20, 2011, mailed Dec. 2, 2013, 3 pgs.
Muse, John Richard; Final Office Action for U.S. Appl. No. 13/164,473, filed Jun. 20, 2011, mailed Dec. 13, 2013, 28 pgs.
Muse, John Richard; Final Office Action for U.S. Appl. No. 13/164,464, filed Jun. 20, 2011, mailed Jan. 10, 2014, 8 pgs.
Muse, John Richard; Applicant Initiated Interview Summary for U.S. Appl. No. 13/164,464, filed Jun. 20, 2011, mailed Mar. 11, 2014, 5 pgs.
Muse, John Richard; Notice of Allowance for U.S. Appl. No. 13/164,464, filed Jun. 20, 2011, mailed Apr. 29, 2014, 11 pgs.
Muse, John Richard; Notice of Allowance for U.S. Appl. No. 13/164,473, filed Jun. 20, 2011, mailed Mar. 13, 2014, 12 pgs.
Muse, John Richard; Supplemental Notice of Allowability for U.S. Appl. No. 13/164,473, filed Jun. 20, 2011, mailed May 27, 2014, 6 pgs.
Muse, John Richard; Issue Notification for U.S. Appl. No. 13/164,473, filed Jun. 20, 2011, mailed Jun. 4, 2014, 1 pg.
Muse, John Richard; U.S. Continuation Application entitled: Bag Stand, having U.S. Appl. No. 14/447,043, filed Jul. 30, 2014, 19 pgs.
Muse, John Richard; U.S. Divisional Application entitled: Bag Stand, having U.S. Appl. No. 14/447,058, filed Jul. 30, 2014, 18 pgs.
Muse, John Richard; Non-Final Office Action for U.S. Appl. No. 13/551,583, filed Jul. 17, 2012, mailed Jul. 15, 2014, 38 pgs.
Muse, John Richard; Issue Notification for U.S. Appl. No. 13/164,464, filed Jun. 20, 2011, mailed Sep. 3, 2014, 1 pg.
Muse, John Richard; Final Office Action for U.S. Appl. No. 13/551,583, filed Jul. 17, 2012, mailed Dec. 31, 2014, 16 pgs.
Muse, John Richard; Non-Final Office Action for U.S. Appl. No. 14/447,043, filed Jul. 30, 2014, mailed Mar. 31, 2015, 32 pgs.
Muse, John Richard; Notice of Allowance for U.S. Appl. No. 14/447,058, filed Jul. 30, 2014, mailed Mar. 30, 2015, 34 pgs.
Muse, John Richard; Non-Final Office Action for U.S. Appl. No. 13/551,583, filed Jul. 17, 2012, mailed Apr. 1, 2015, 12 pgs.

\* cited by examiner

BAG STAND

CROSS-REFERENCE TO RELATED APPLICATIONS

This application claims the benefit of U.S. Provisional Application 61/508,914 filed on Jul. 18, 2011, which is hereby incorporated herein in its entirety by reference.

FIELD

The present disclosure relates to refuse disposal. More specifically, this disclosure relates to apparatus for facilitating holding open and filling a refuse bag.

BACKGROUND

To be discarded, refuse is typically bagged. However, refuse bags tend to be non-rigid and quite flexible. Particularly with lawn refuse, filling a refuse bag may become difficult when the refuse itself is non-solid or requires two hands to place into the bag. For example, leaves, needles, dirt, and sticks tend not to hold together when a user attempts to place such items in a bag. When attempting to place such items in the refuse bag, the refuse bag is subject to collapsing.

SUMMARY

A bag stand is disclosed for supporting and holding open a refuse bag to facilitate filling the refuse bag. The bag stand is oriented to allow the bag stand and refuse bag together to stand vertically with respect to the ground and allow a user to fill the refuse bag without the need to hold the refuse bag open manually.

DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

DETAILED DESCRIPTION

Figure 1:
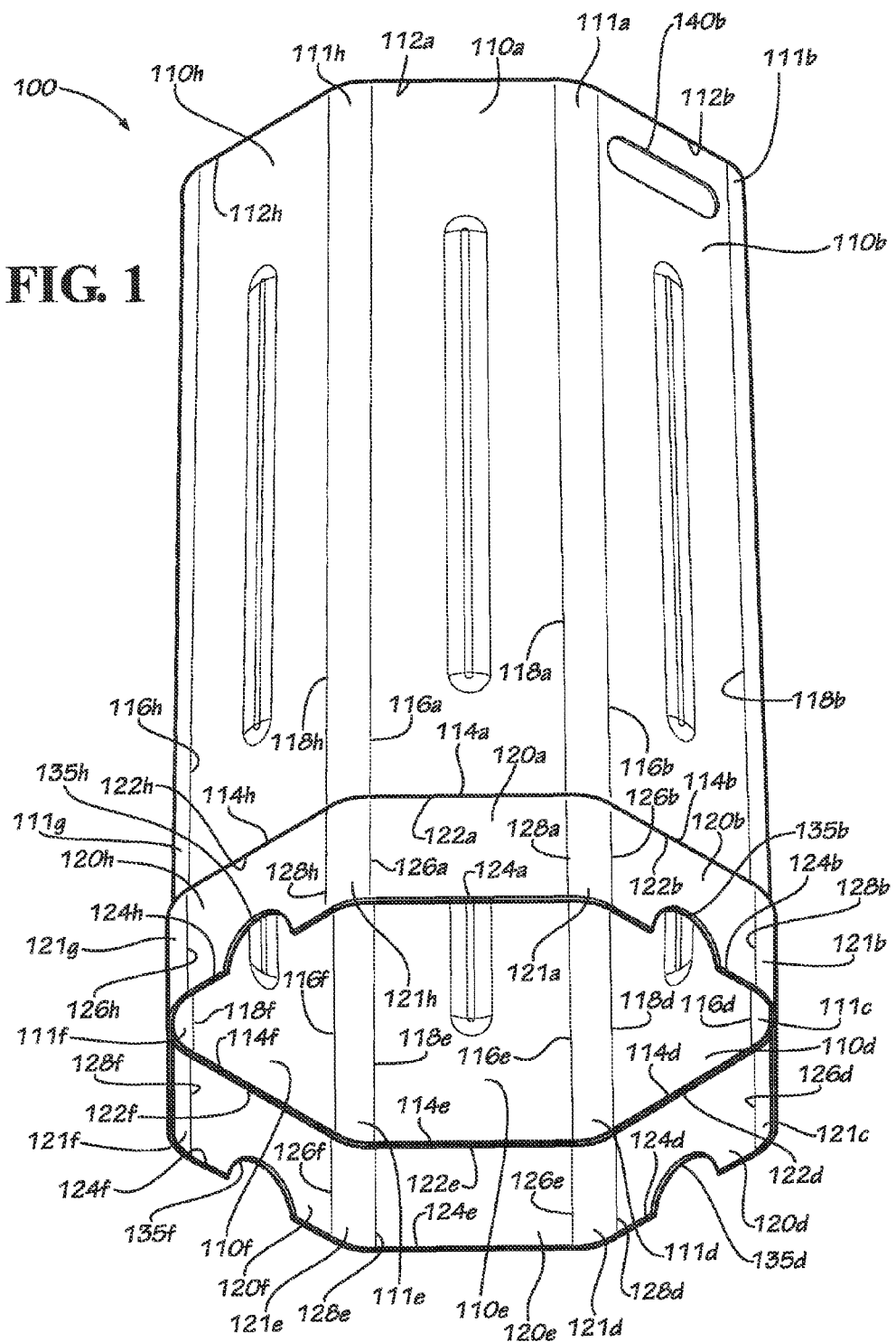
FIG. 1 is a perspective view of a bag stand for use with a refuse bag in accord with one embodiment of the current disclosure.

Disclosed is a bag stand to assist holding and filling refuse bags. FIG. 1 displays a bag stand 100 having a plurality of side panels 110(a,b,c,d,e,f,g,h) connected together and arranged along the outside of the bag stand 100 to form a hollow structure for holding a refuse bag.

The current embodiment of the bag stand 100 includes eight side panels 110a,b,c,d,e,f,g,h. Any number of side panels 110 may be used in alternative embodiments. In the current embodiment, all side panels 110a,b,c,d,e,f,g,h are dimensioned about the same size and are about rectangular in shape. However, in alternative embodiments, the side panels 110 may be of different sizes or shapes from each other and from the current embodiment.

Each of the side panels 110 has a top end 112, a bottom end 114, a left end 116, and a right end 118. The side panels 110 are connected to each other having the left end 116 of one side panel 110 connected to the right end 118 of an adjacent side panel 110.

All references to "left" and "right" in this disclosure are intended to refer to the left and right directions when viewed from the outside with the top end up and the bottom end down. All connections to which this disclosure refers may be any connection sufficient to hold together the elements to be connected, including an integrated construction, glue, a notched end, or other types of connecting means.

Located adjacent to each side panel 110 and connecting each side panel 110 to another side panel is a connecting panel 111. In the current embodiment, each connector is rounded or filleted so that each side panel 110 is flat and each connecting panel 111 provides an angle of curvature between each side panel 110 and each adjacent side panel 110. Because there are eight side panels 110a,b,c,d,e,f,g,h in the current embodiment, each connecting panel 111 provides 45-degrees of angle between the two side panels 110 to which that connecting panel 111 connects.

Connected to the bottom end 114 of each side panel 110 is a foot panel 120. Each foot panel has a top end 122, a bottom end 124, a left end 126, and a right end 128. Each foot panel 120 is connected to another foot panel 120 by a connecting panel 121. Because there are eight foot panels 120a,b,c,d,e,f,g,h in the current embodiment, each connecting panel 121 provides 45-degrees of angle between the two foot panels 120 to which that connecting panel 121 connects.

A foot panel cutout 135b,d,f,h is defined in the bottom end 124b,d,f,h of every other foot panel 120b,d,f,h. The foot panel cutouts 135b,d,f,h allow air to pass from inside the bag stand 100 to the outside. The foot panel cutouts 135 are semicircular in shape in the current embodiment but may be any shape in other embodiments. Further, although four foot panel cutouts 135 are present in the current embodiment, any number of foot panel cutouts 135 may be included in various embodiments. Handle cutouts 140b and 140f (not shown) are defined in side panels 110b and 110f.

Figure 2:
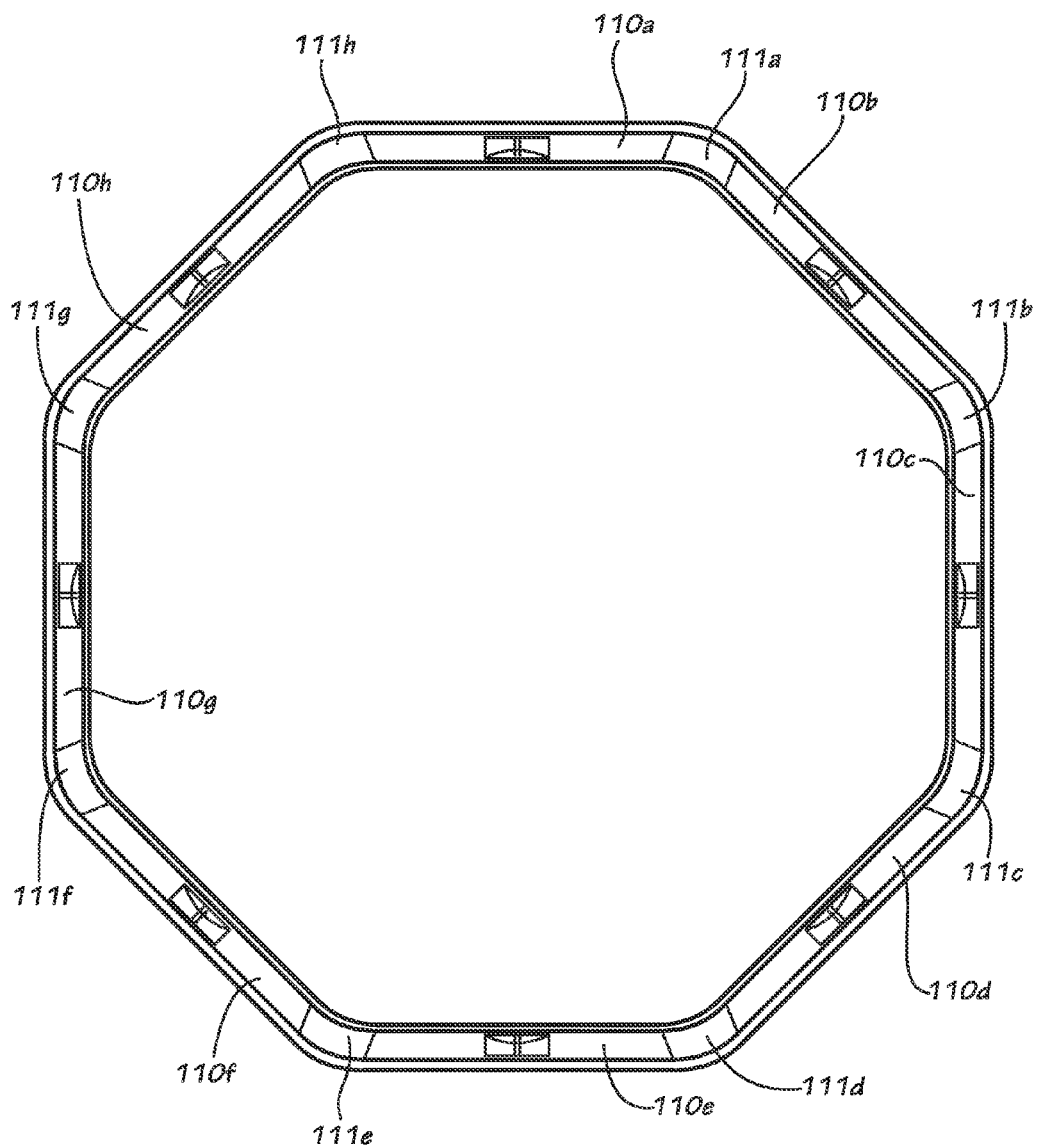
FIG. 2 is a bottom view of the bag stand of FIG. 1.

The bag stand 100 is composed of one-piece blow molded plastic. However, other generally-rigid materials may also be used to compose the bag stand 100, including corrugated cardboard or paper, linerboard, polymer, metal, alloy, wood, mesh, laminate, reinforced woven or nonwoven fabric, cellulose, resin, Styrofoam, composite, and combinations or mixtures of the foregoing, among others. The bag stand 100 of the current embodiment is not collapsible, although a collapsible bag stand 100 is considered part of this disclosure. FIG. 2 displays a bottom view of the bag stand 100. In FIG. 2, the draft angle of the bag stand 100 can be seen as the bottom of the bag stand is larger than the top.

Figure 3:
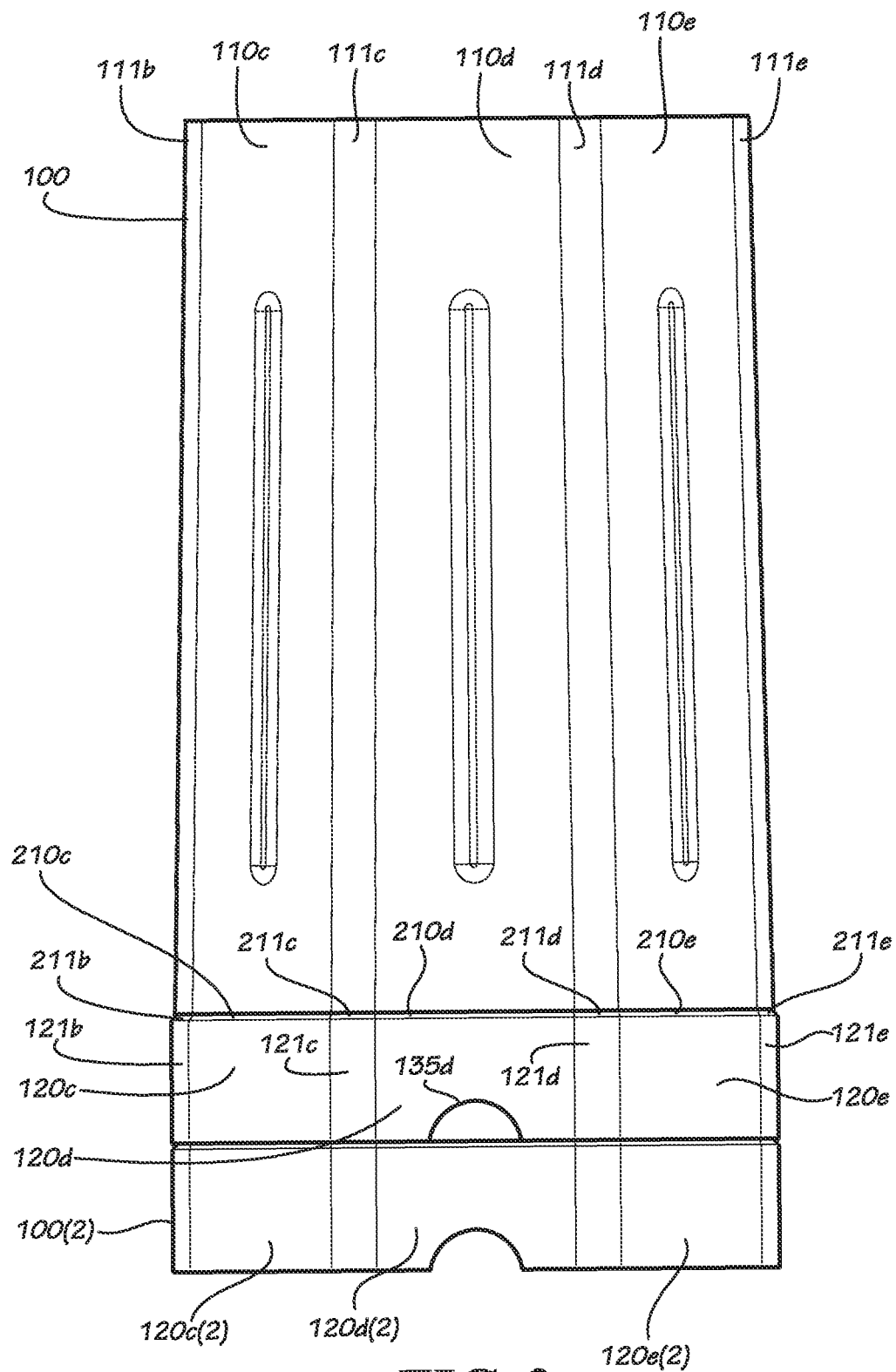
FIG. 3 is a side view of two bag stands of FIG. 1 shown in a nested arrangement.
Figure 4:
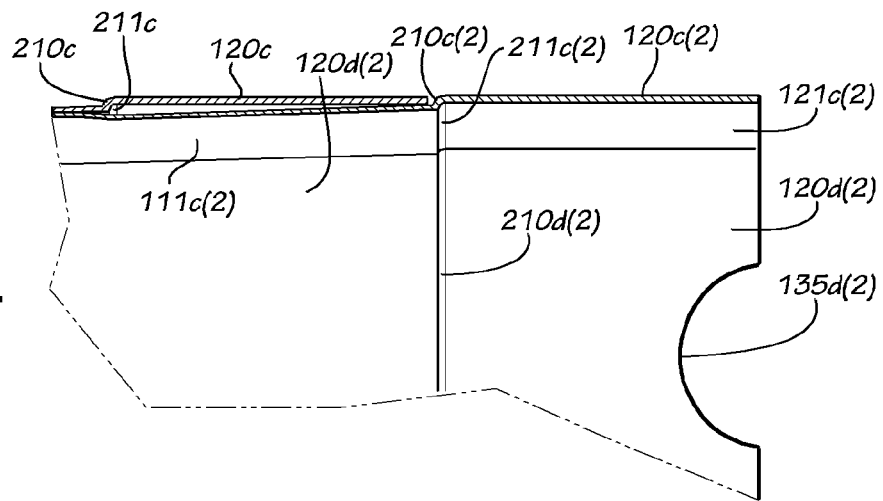
FIG. 4 is a cross-sectional detail view of foot panels of the nesting bag stands of FIG. 3.
Figure 5:
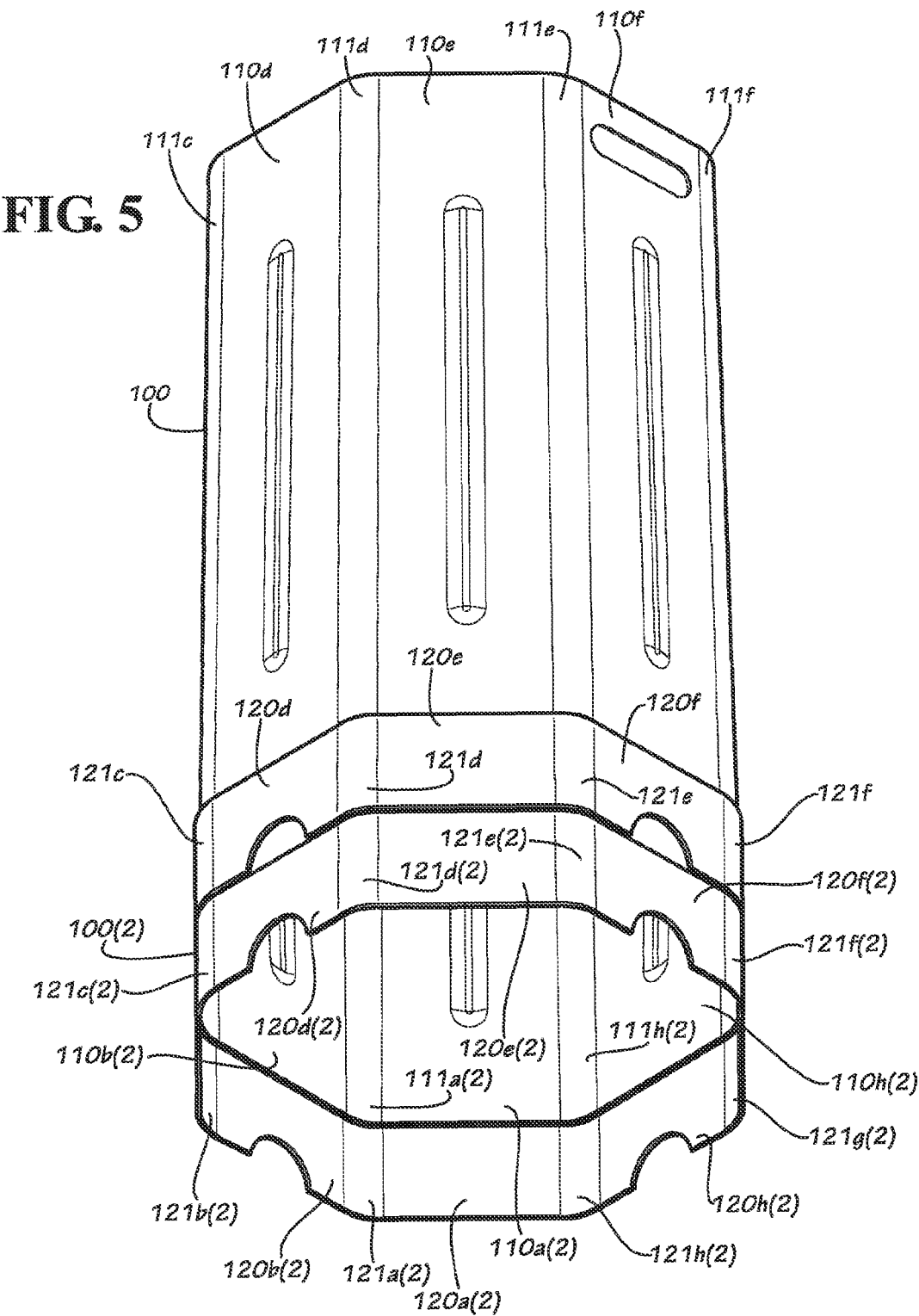
FIG. 5 is a perspective view the nesting bag stands of FIG. 3.

As seen in FIG. 3, the bag stand 100 is capable of nesting with another bag stand 100(2). Additionally, it can be seen that each foot panel 120 is not directly connected to each side panel 110 in the current embodiment. Instead, a step panel 210 connects the two pieces and allows a step out for the foot panel 120. This allows the region of the foot panel 120 to be substantially vertical while the region of the side panel 110 is drafted, as discussed above. Additionally, a connection step panel 211 connects each connection panel 111 with each connection panel 121. The step panel 210 and connection step panel 211 can be seen in cross-sectional detail view in FIG. 4. A perspective view of the nesting bag stands 100,100(2) can be seen in FIG. 5.

Figure 6:
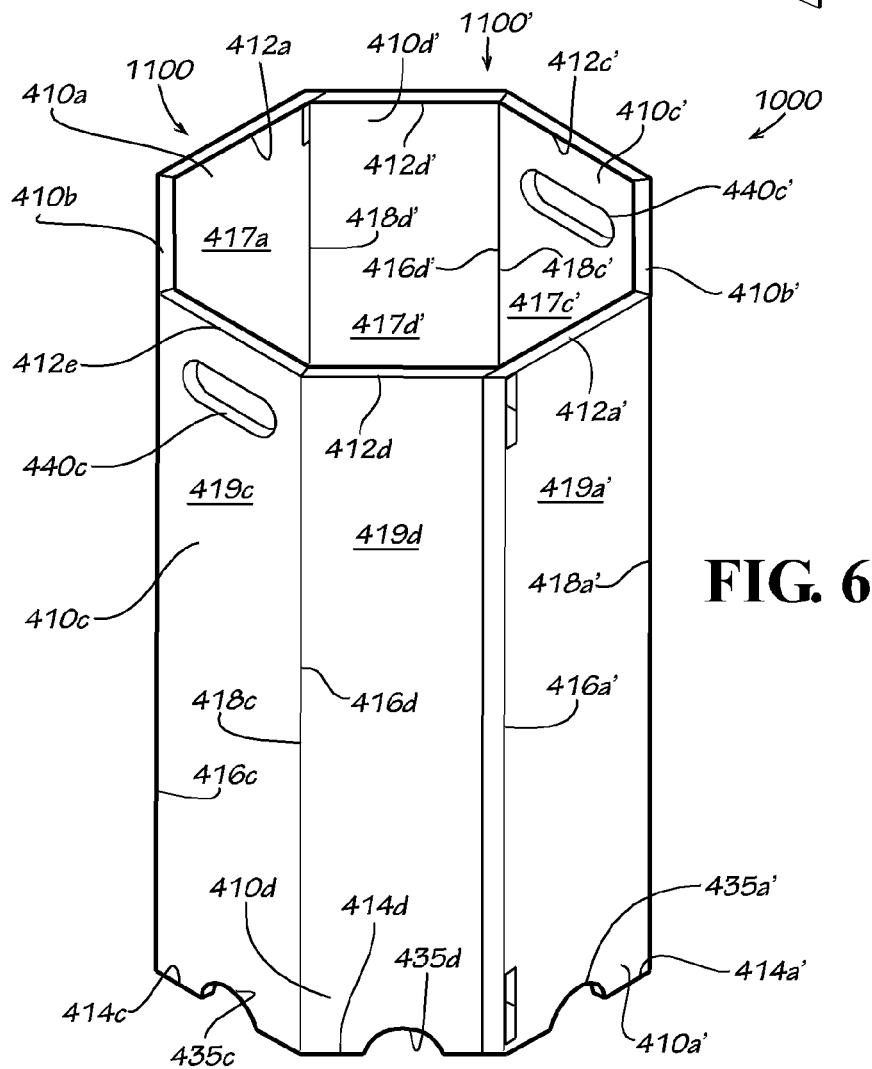
FIG. 6 is a perspective view of a bag stand for use with a refuse bag in accord with one embodiment of the current disclosure.

In another embodiment, seen in FIG. 6, a bag stand 1000 is composed of two half stand panels 1100 (denoted as 1100 and 1100' in FIG. 6 for reference). Each half panel 1100 includes four side panels 410a,b,c,d. Each side panel 410 includes a top end 412, a bottom end 414, a left end 416, a right end 418, an inner surface 417, and an outer surface 419. A panel foot cutout 435 is defined in the bottom end 414 of each side panel 410, although any number of panel foot cutouts 435 may be included. In the current embodiment, the panel foot cutout 435 is semi-circular in shape, although it may be various shapes in various embodiments. A handle cutout 440c is shown defined on the side panel 410c, although handle cutouts 440 may not be included in some embodiments, may be included on any of the side panels 410 in some embodiments, and may be included on more than one side panel 410 in some embodiments.

Figure 7:
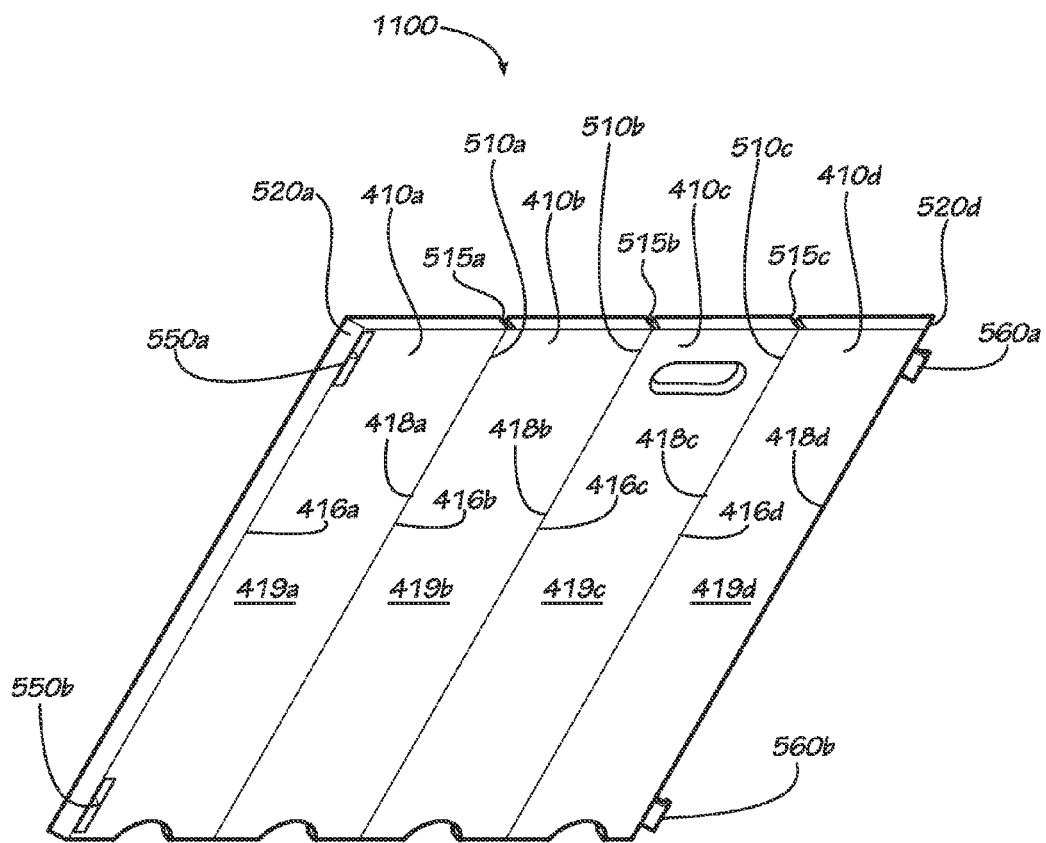
FIG. 7 is a perspective view of a half panel of the bag stand of FIG. 6.

FIG. 7 shows one half panel 1100 alone in a flattened arrangement. The arrangement of the half panel 1100 includes a living hinge 510 between side panels 410 in the current embodiment such that living hinge 510a connects side panel 410a to side panel 410b, a living hinge 510b connects side panel 410b to side panel 410c, and a living hinge 510c connects side panel 510c to side panel 510d. A clearance void 515 is shown between connected side panels 410. The clearance voids 515 allow the side panels 410 room to flex inwardly to create the shape required to build the bag stand 1000.

Also shown on left end 416a is a matching slope 520a. A matching slope 520d located on the right end 418d. The matching slopes 520a,d allow the ends 416a,418d to align flushly with the side panels 410 when the bag stand 1000 is assembled.

In the current embodiment, each side panel 410a,b,c,d has a visible thickness between the outer surface 419 and the inner surface 417. In various embodiments, the thickness may be small or large. With embodiments of smaller thickness, matching slopes 520a,d and clearance voids 515 may not be included or may be negligible. Further, in other embodiments, matching slopes 520a,d and clearance voids 515 may not be included although thickness is visible, as in the current embodiment, or large.

Figure 8:
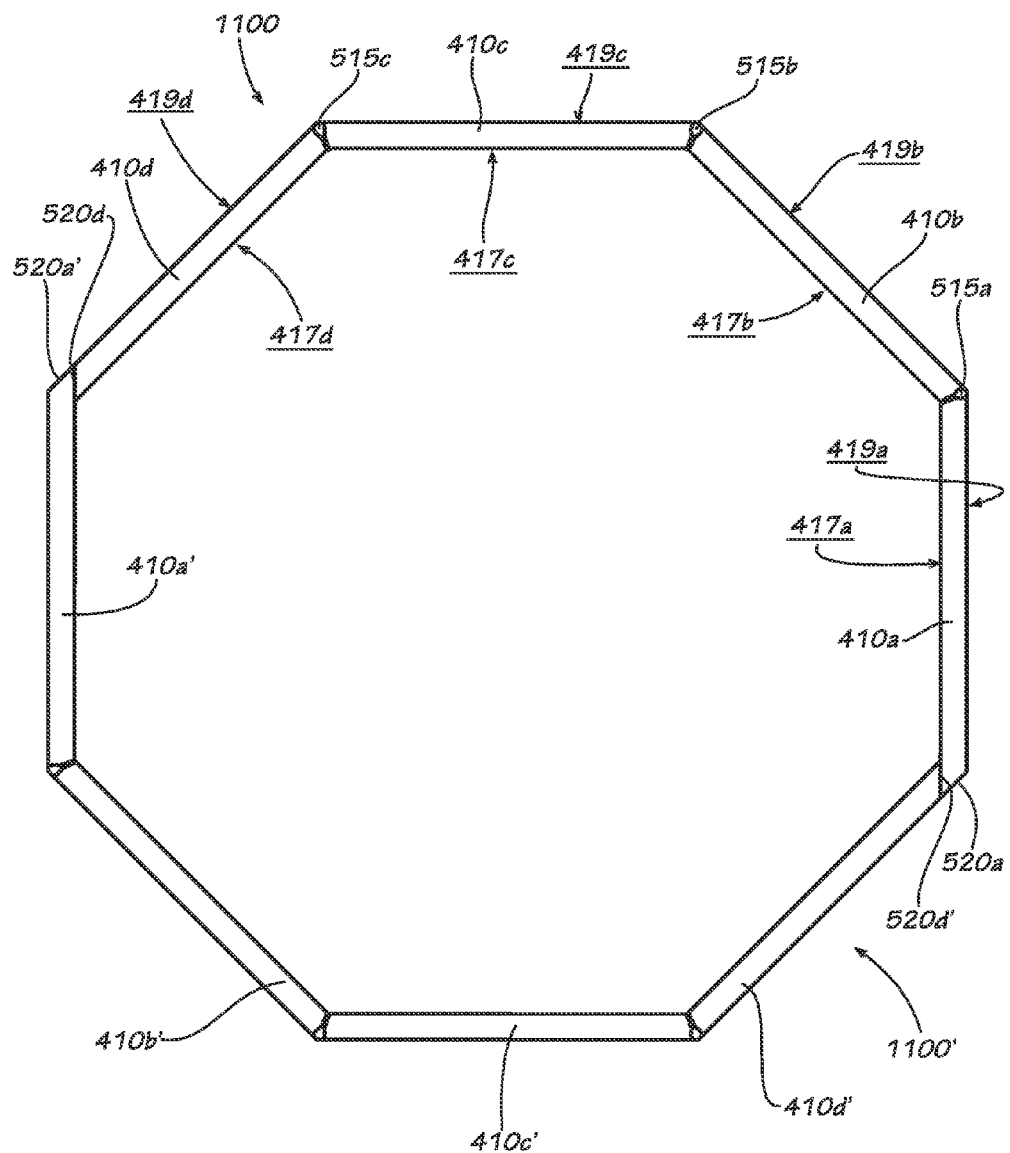
FIG. 8 is a top view of the bag stand of FIG. 6.

FIG. 7 displays the connection mechanism for the half panel 1100 to connect to another half panel 1100. Connection recesses 550a,b are defined in side panel 410a proximate the left end 416a. Connection fingers 560a,b protrude from matching slope 520d. The connection fingers 560a,b are intended to insert into the connection recesses 550a,b. A top view of the bag stand 1000 is seen in FIG. 8. The clearance voids 515 are smaller, as the side panels 410 have been bent along the living hinges 510. Various connection mechanisms known in the art may also be used without deviating from the scope of the current embodiment.

Figure 9:
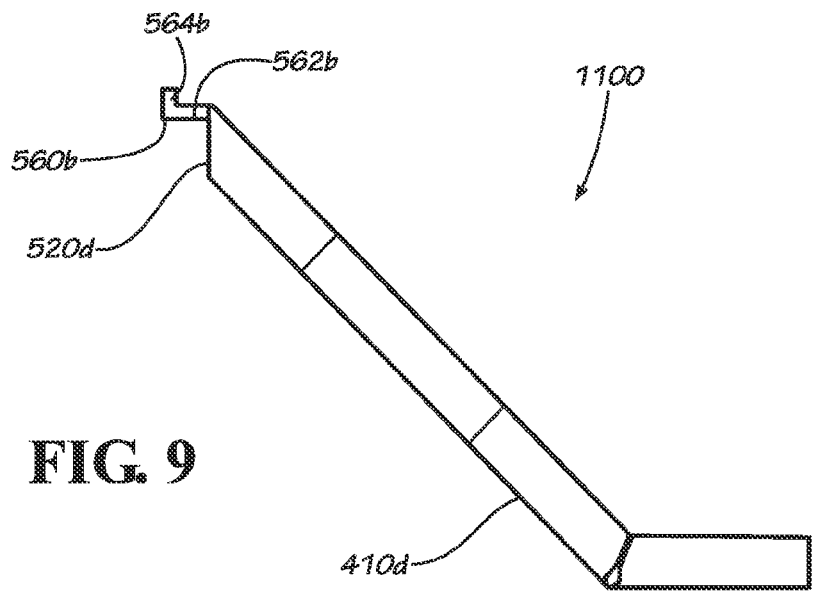
FIG. 9 is a detail view of the bottom of the half panel of FIG. 7.
Figure 10:
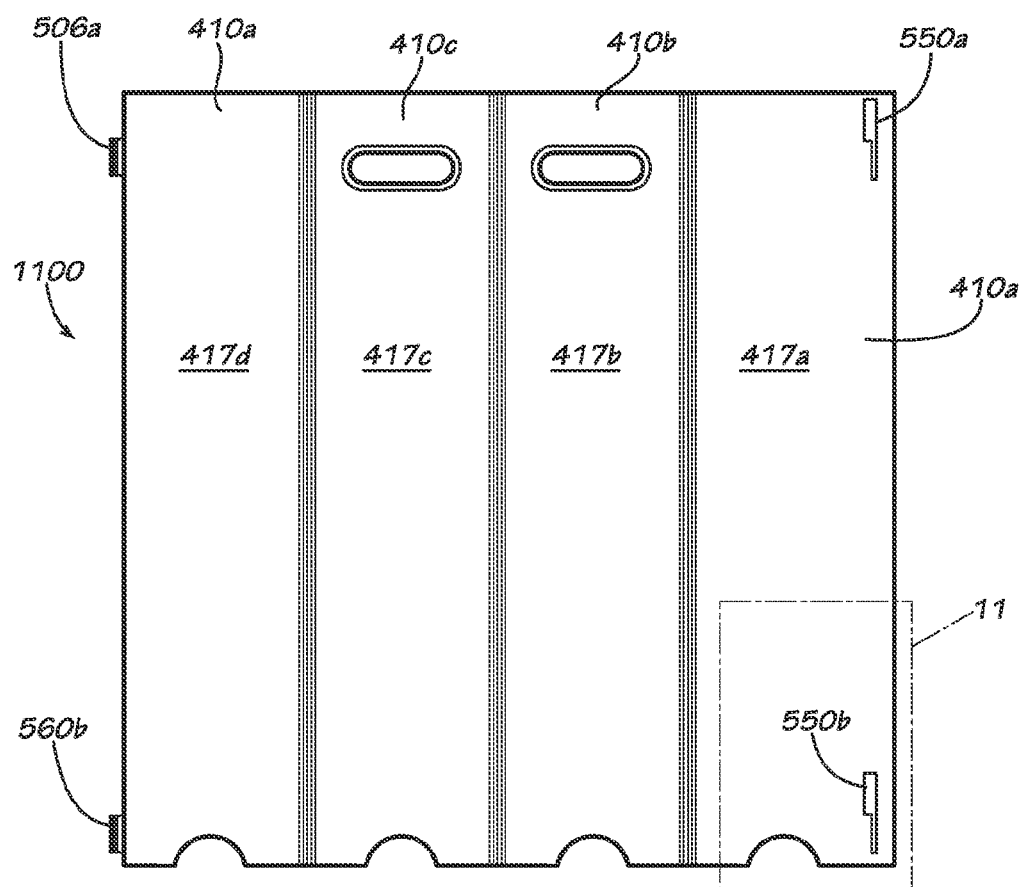
FIG. 10 is an inner side view of the half panel of FIG. 7.
Figure 11:
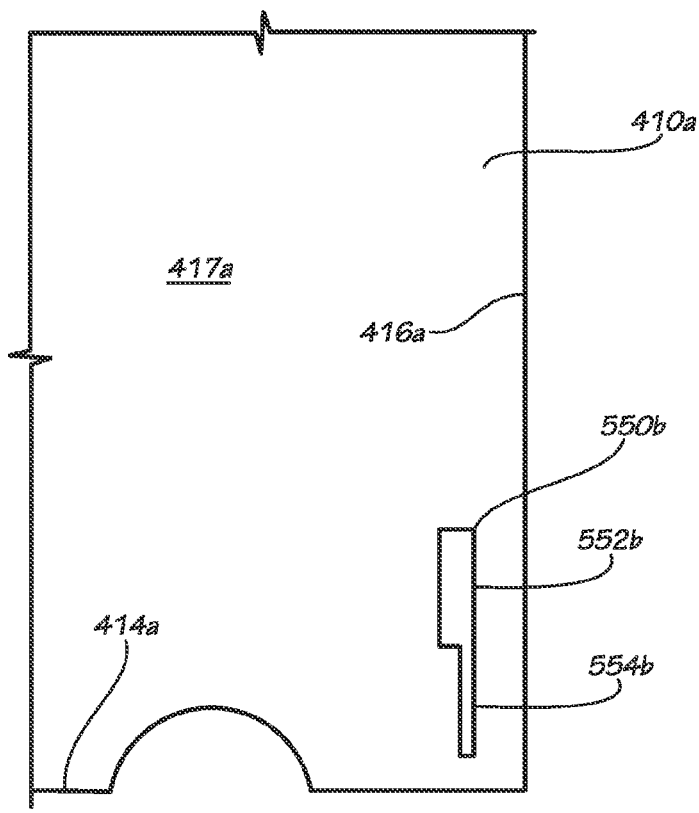
FIG. 11 is a detail view of the inner surface of the half panel of FIG. 7.

As can be seen in FIG. 9, a bottom view of the half panel 1100, the connection finger 560b can be seen. Each connection finger 560a,b includes a clearance portion 562a,b and a clasp portion 564a,b. An inner profile of the half panel 110 can be seen in the side view of FIG. 10 showing the connection fingers 560a,b and the connection recesses 550a,b. As can be seen in FIG. 11, a detail view of the inner surface 417a at the bottom end 414a of side panel 410a, each connection recess 550a,b includes a clearance portion 552a,b and a lock portion 554a,b.

Figure 12:
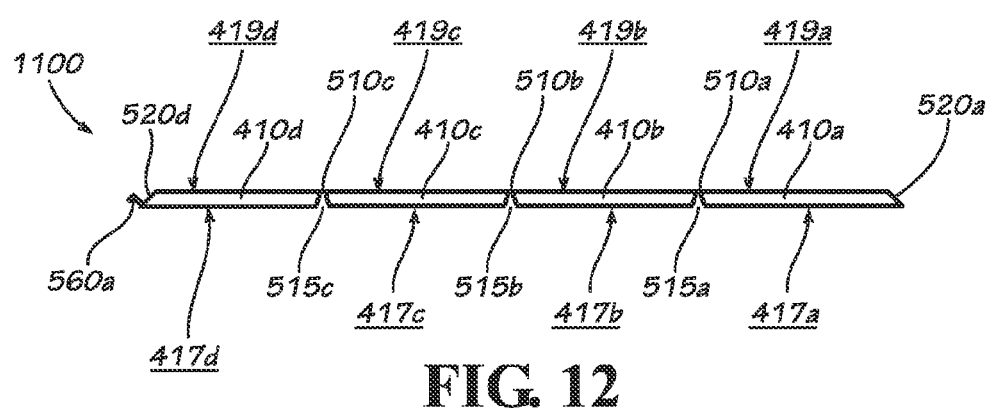
FIG. 12 is a top view of the half panel of FIG. 7.

FIG. 12 displays a top view of the half panel 1100. The unbent profile of the living hinges 510 and the clearance voids 515 can be seen. Moreover, the matching slopes 520a,d are also seen in the profile from the top view.

Figure 13:
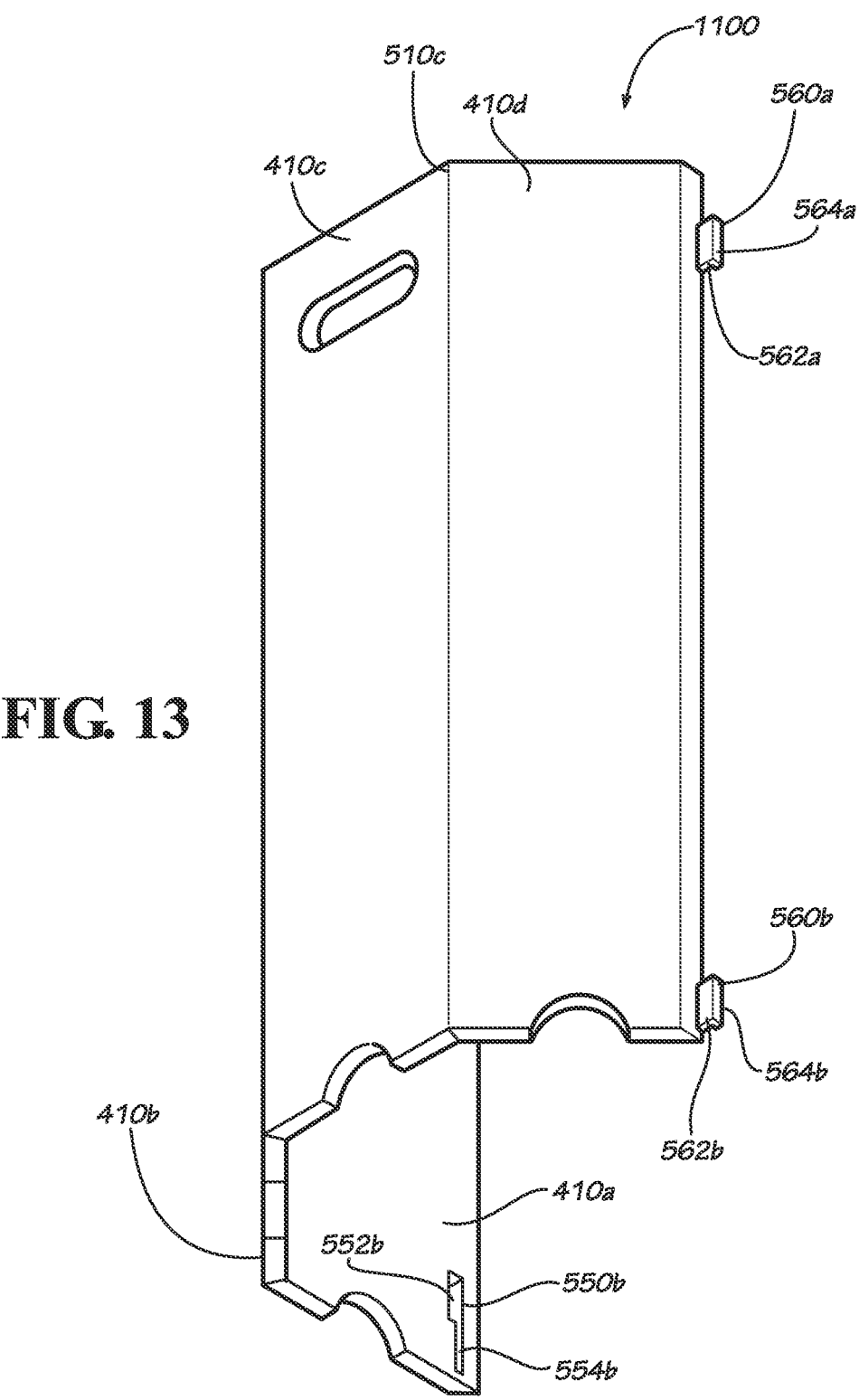
FIG. 13 is a perspective view of the half panel of FIG. 7 in a bent arrangement.

As seen in FIG. 13, to assemble the bag stand 1000, the half panel 1100 is bent along the living hinges 510a,b,c until it covers a path of approximately 180-degrees. Another half panel 1100 is introduced (not shown). Each clearance portion 562a,b is aligned with and inserted into each corresponding clearance portion 552a,b. Once the clearance portion 562 passes fully into the clearance portion 552, each clasp portion 564 is allowed to slide downward into each lock portion 554. Once the clasp portion 564 slides into the lock portion 554, the connection finger 560 cannot be removed from the connection recess 550 without first raising the clearance portion 562 above the lock portion 554. Although half panels 1100 are shown in pairs in the current embodiment, any number of subpanels may be used to accomplish the objective of a collapsible bag stand. In some embodiments, three third panels may be utilized, each third panel include a certain number of side panels. In some embodiments, quarter panels may be used. In further embodiments, various arrangements of side panels may be used to make the bag stand expandable or contractible in size to accommodate various bag sizes. Various arrangements would be obvious to one of ordinary skill in the art.

To use the bag stand 100 or the bag stand 1000, a user places a refuse bag over the bag stand 100,1000. The user may fill the refuse bag, remove the refuse bag, and discard the refuse bag separately of the bag stand 100,1000. The bag stand 1000 may be disassembled after use by removing each connection finger 560 from each connection recess 550 and unfolding the side panels 410a,b,c,d. The bag stand 100 as disclosed herein is not collapsible, although a collapsible bag stand is included in this disclosure.

Although this disclosure describes bag stands 100,1000 including all side panels (110,410) connected to each other, this disclosure is intended to include an embodiment of a bag stand 100,1000 with fewer side panels or with some side panels absent to achieve certain advantages.

It should be emphasized that the embodiments described herein are merely possible examples of implementations, merely set forth for a clear understanding of the principles of the present disclosure. Many variations and modifications may be made to the described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

One should note that conditional language, such as, among others, "can," "could," "might," or "may," unless specifically stated otherwise, or otherwise understood within the context as used, is generally intended to convey that certain embodiments include, while alternative embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. Unless stated otherwise, it should not be assumed that multiple features, embodiments, solutions, or elements address the same or related problems or needs.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

What is claimed is:

1. A bag stand comprising:
    at least three side panels, each side panel having a top end, a bottom end, and two adjacent side ends, each side panel being flat, each side panel connected to each of two adjacent side panels by a connection panel, the bag stand defining a top opening, a draft angle, and an interior, the interior enclosed by the side panels, the top opening sized to accept a refuse bag, and
    at least one foot panel connected proximate the bottom end of at least one side panel, each foot panel also connected to at least one adjacent foot panel by a connecting panel, the bag stand further defining a bottom opening when the at least one foot panel is connected proximate the bottom end of at least one side panel.

2. The bag stand of claim 1, wherein the bag stand includes eight side panels.

3. The bag stand of claim 1, wherein the bottom opening is larger than the top opening.

4. The bag stand of claim 1, wherein at least one foot panel defines at least one foot panel cutout.

5. The bag stand of claim 1, wherein the bag stand is formed of blow-molded plastic.

6. The bag stand of claim 1, wherein the draft angle is sufficient to allow nesting with a second bag stand having the same geometry as the first bag stand.

7. The bag stand of claim 1, wherein at least a portion of a bottom end of at least one foot panel of the bag stand is able to rest on a top end of at least one foot panel of a second bag stand with the second bag stand having the same geometry as the first bag stand.

8. The bag stand of claim 1, wherein at least one foot panel is connected to the bottom end of at least one side panel by a step panel.

9. The bag stand of claim 1, wherein the at least one foot panel is substantially vertical and the at least one side panel is drafted.

10. A bag stand comprising:
    at least three side panels, each side panel having a top end, a bottom end, and two adjacent side ends, each side panel being flat, each side panel connected to each of two adjacent side panels by a connection panel, each side panel oriented at about forty-five degrees with respect to each adjacent side panel, the bag stand defining a top opening and an interior, the interior enclosed by the side panels, the top opening sized to accept a refuse bag, and
    at least one foot panel connected proximate the bottom end of at least one side panel, the bag stand further defining a bottom opening when the at least one foot panel is connected proximate the bottom end of at least one side panel.

11. The bag stand of claim 10, wherein at least one foot panel defines at least one foot panel cutout.

12. The bag stand of claim 10 further defining a draft angle, wherein the draft angle is sufficient to allow nesting with a second bag stand having the same geometry as the first bag stand.

13. The bag stand of claim 10, wherein at least one foot panel is connected to the bottom end of at least one side panel by a step panel.

14. The bag stand of claim 10, wherein the at least one foot panel is substantially vertical and the at least one side panel is drafted.

15. A bag stand comprising:
    at least three side panels, each side panel having a top end, a bottom end, and two adjacent side ends, each side panel being flat, each side panel connected to each of two adjacent side panels by a connection panel, each connection panel providing an angle of curvature between the side panels to which each connection panel is connected, the side panels forming the bag stand having a top end and a bottom end, the bag stand defining a top opening and an interior, the interior enclosed by the side panels, the top opening sized to accept a refuse bag, and
    at least one foot panel connected proximate the bottom end of at least one side panel, the bag stand further defining a bottom opening when the at least one foot panel is connected proximate the bottom end of at least one side panel.

16. The bag stand of claim 15, wherein the bag stand includes eight side panels.

17. The bag stand of claim 15, wherein the bottom opening is larger than the top opening.

18. The bag stand of claim 15, wherein the bag stand is formed of blow-molded plastic.

19. The bag stand of claim 15 further defining a draft angle, wherein the draft angle is sufficient to allow nesting with a second bag stand having the same geometry as the first bag stand.

20. The bag stand of claim 15, wherein the at least one foot panel is substantially vertical and the at least one side panel is drafted.

* * * * *